TAPE REELING SEARCH SYSTEM WITH TRANSISTOR SEARCH AMPLIFIER

Filed March 31, 1967

INVENTOR
DALLAS R. ANDREWS
BY Eugene M. Whitacre
ATTORNEY 3,505,485

TAPE REELING SEARCH SYSTEM WITH TRANSISTOR SEARCH AMPLIFIER

Dallas R. Andrews, Indianapolis, Ind., assignor to RCA Corporation, a corporation of Delaware Filed Mar. 31, 1967, Ser. No. 627,464
Int. Cl. G11b 5/78
U.S. Cl. 179—100.2 1 Claim

ABSTRACT OF THE DISCLOSURE

In a magnetic tape recorder including fast forward reeling, the fast forward operation after initiation is maintained in response to sound information transduced from the tape being reeled.

This invention relates to tape player apparatus and more particularly to tape player apparatus adapted for use with endless loop tape cartridges.

In recent years there has been introduced for commercial use, tape player apparatus of the type designed to operate with an endless loop tape cartridge. In this type of apparatus, the innermost convolution of a spirally wound roll of tape contained in a cartridge is caused to be drawn out, passed into cooperative relationship with a transducer, and then wound around the outermost convolution of the tape roll.

One of the problems associated with this type of player-tape cartridge system is its lack of an effective means for hunting, i.e. the locating on the tape of the start of a particular pre-recorded selection or message, since, due to the operational nature of the system, the direction of tape travel cannot be reversed to repeat the recording or reproduction of a portion of the tape.

A suggested solution to the problem has been to provide the player apparatus with a fast forward reeling tape drive function, and in the cartridge to apply some marker means, such as a recorded burst of signal or conductive foil, on the tape at the end of each recorded selection or message. The marker would serve to signal a sensing means associated with the fast forward operating control and cause the automatic disengagement thereof. Thus, the sensing means would detect the marker and cause the fast forward tape reeling to be stopped. However, due to the use of the marker, the large inventories of endless loop cartridges already in the field and lacking the special markings would not be compatible with the automatic disengaging feature of such a fast forward reeling system.

It is an object of the present invention to provide in a tape player apparatus, an improved fast forward tape reeling system.

It is another object of the present invention to provide in a tape player apparatus, a system operative to automatically cause the cessation of a fast forward tape reeling operation at the end of a pre-recorded selection or message.

According to an embodiment of the present invention, a tape player apparatus includes a tape reeling fast forward drive mechanism. After a fast forward tape reeling operation has been initiated, means responsive to sound information prerecorded on the tape being reeled, causes the fast forward tape reeling to be maintained. Means are also provided for stopping the fast forward tape reeling in an absence of said sound information recorded on the tape.

Figure 1:
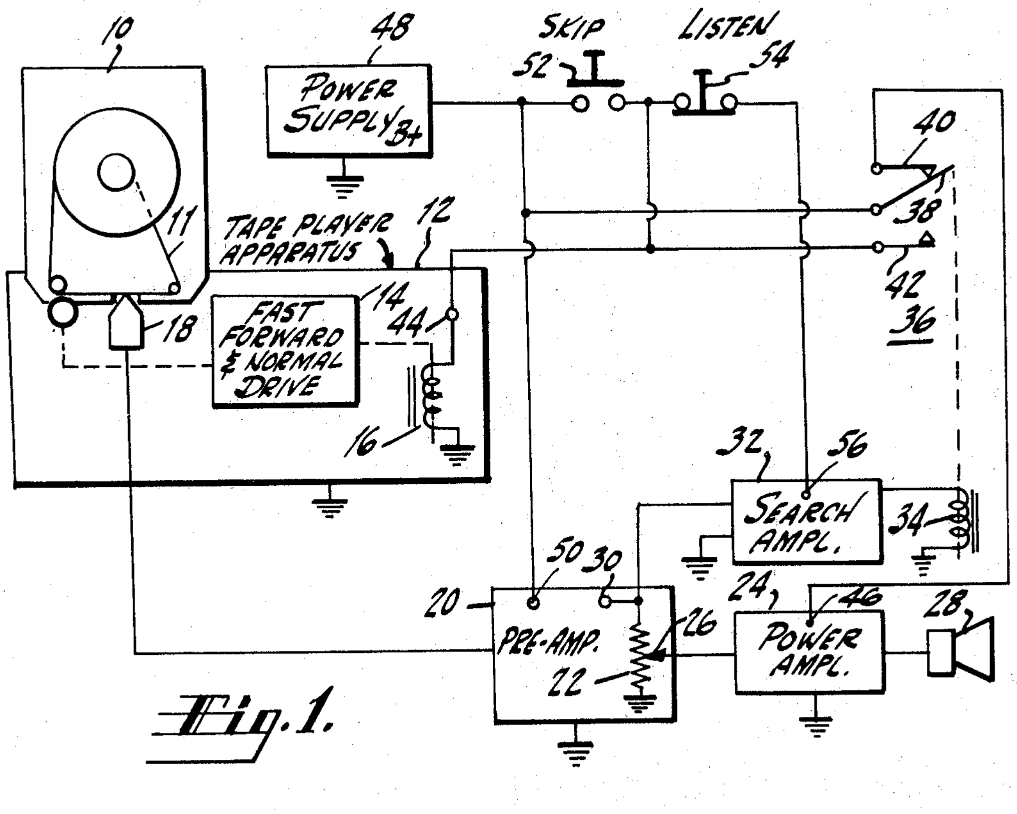
Figure 2:
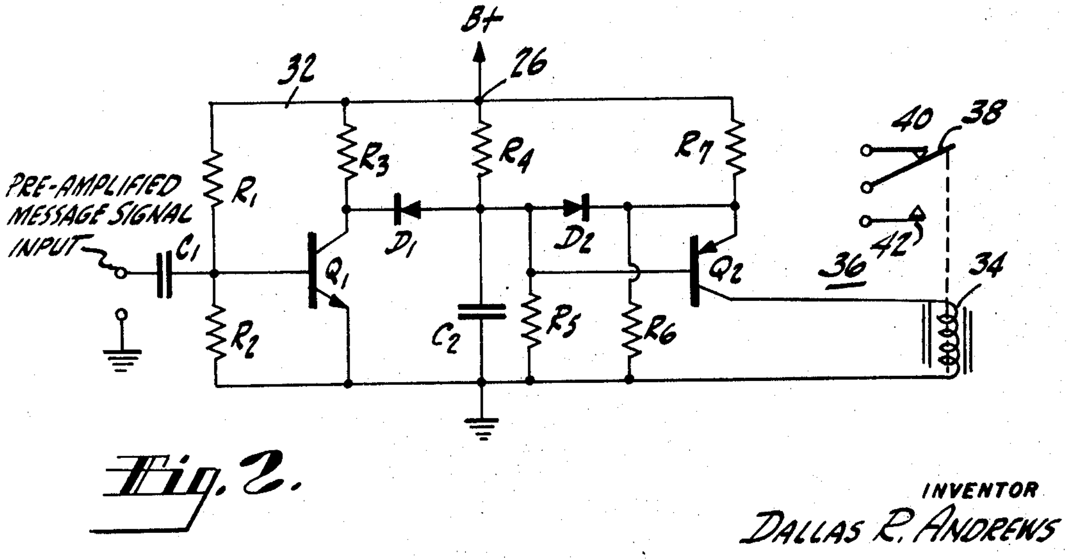

The novel features which are considered to be characteristic of the invention are set forth with particularity in the appended claims. The invention itself, however, both as to its organization and method of operation as well as additional objects and advantages thereof, will best be understood from the following description when read in connection with accompanying drawings in which:

FIGURE 1 is a schematic circuit diagram in block form of a tape reeling search system in accordance with the present invention; and FIGURE 2 is a schematic circuit diagram of a search amplifier suitable for use in the system of FIGURE 1.

Referring now to FIGURE 1, there is shown a block diagram of the fast forward search system of the present invention adapted for incorporation into an endless loop tape cartridge 10-player apparatus 12 having a fast forward reeling drive function 14 of the type which is controlled and mechanically brought into operation by an electrically energized means, as for example a solenoid 16. It will be understood, however, that the block 14 may also include means for driving the tape 11 contained in the cartridge 10 at a normal reeling (play) speed and where the linkage between the fast forward drive and the normal drive is such that with a cartridge 10 inserted into the player apparatus 12, either the fast forward drive or the normal drive will be responsible for reeling of the tape. Such electromechanical arrangements are known in the art and will not be described herein. It will also be understood that the tape player apparatus 12 utilized includes one or more magnetic heads 18 for transducing a pre-recorded tape message into a corresponding electrical information message signal output.

The electrical signal output obtained from the player apparatus transducer(s) 18 is coupled to a preamplifier stage 20 for amplification. A variable resistance type volume control 22 for the tape player power amplifier stage 24 is normally located in this amplifier 20. As is conventional, the pre-amplified signal is coupled via the variable tap connection 26 on the volume control 22 to the power amplifier 24 wherein it is further amplified and then applied to a loudspeaker 28 for aural reproduction of the recorded message.

In accordance with a preferred embodiment of the present invention, connection is made from a signal output terminal 30 within the preamplifier 20 and prior to the tapped output terminal 26, for coupling of the pre-amplified transduced electrical message signal to the input of a search amplifier 32. Thus, in this manner, the level of the signal coupled from the preamplifier 20 to the search amplifier 32 is independent of the setting of the volume control.

The output of the search amplifier 32 is connected to a loading device which is illustrated as the coil 34 of a relay 36. The relay 36 has a movable arm 38 which is caused to shift between two fixed contacts 40 and 42 in response to a current flowing through the coil 34. The current gain of the search amplifier is such that the current caused to flow through the coil 34 due to a pre-amplified message signal applied to the search amplifier is of sufficient magnitude to energize the coil 34 and operate the relay 36. Connection is made from the relay contact 42 (normally open when the relay is unenergized) to the B+ operating potential input terminal 44 of the solenoid or electromechanical device 16. Connection is also made from the relay contact 40 (normally in a closed position when the relay is unenergized) to the B+ operating potential input terminal 46 of the tape player power amplifier 24. The movable arm contact 38 is directly connected to a source of operating potential B+, indicated as a power supply 48, and to the B+ operating potential input terminal 50 of the preamplifier stage 20.

As shown in FIGURE 1, a pair of push button two point momentary contact type switches, one 52 of which is normally open, and the other 54 of which is normally closed, are serially connected between the B+ operating potential source 48 and a B+ operating potential input terminal 56 of the search amplifier 32. A connection is also made from the junction of the switches 52 and 54 to the B+ operating potential input terminal 44 of the solenoid 16. Thus, when the relay 36 is energized or the skip button 52 is depressed, the B+ operating potential is applied to the solenoid 16 and the search amplifier 32.

Considering the tape player preamplifier and power amplifier stages 20 and 24 respectively, it will be seen that a B+ operating potential is directly applied to the preamplifier stage 20 and is indirectly applied via the movable arm 38 and contact 40 to the power amplifier stage 24 only when the relay 36 is unenergized. This provides an effective signal "squelch" system for the power amplifier stage 24 during a fast forward reeling operation as will be hereinafter described.

The search system operates as follows. When it is desired to operate the tape player in the fast forward mode, the skip button 32 is momentarily depressed. This provides a direct current circuit path for the B+ operating potential to the electromechanical device or solenoid 16 thereby energizing same, operationally activating the fast forward drive, and causing a fast forward reeling operation to begin. In addition, depressing the skip button 52 also causes the B+ operating potential to be coupled to the search amplifier 56. If a message is present on the tape at this time, it will be picked up by the transducer 18 and converted into an electrical signal which in turn is amplified in the preamplifier stage 20 and then coupled to the search amplifier 32. With an operating potential applied to the search amplifier and a message signal input coupled thereto, sufficient current will be caused to flow through the coil 34 so as to energize and hold the relay 36, thereby shifting movable arm 38 from contact 40 to contact 42. With the movable arm on contact 42, a direct current circuit path for the B+ operating potential is provided from the power supply 48 via the arm 38 and contact 42 to the solenoid 16 and search amplifier 32 so as to maintain the fast forward reeling operation. At the same time, the B+ operating potential is removed from the power amplifier stage 24, thus squelching its audio output to the loudspeaker 28. As long as a sound message is present on the tape being reeled past the transducer head 18, the relay 36 will remain energized, thus maintaining the fast forward reeling operation. When, on the tape being reeled, the end of a message portion is reached, or in the case of a musical selection, a break or pause in the music occurs, the hold current through the coil 34 will decay, thereby de-energizing the relay 36 and thus decoupling the B+ operating potential from the solenoid 16 and search amplifier 32 and stopping the fast forward reeling operation of the tape player apparatus. The response of the search amplifier, and thus the rate of decay of the relay holding current relative to the time duration of the music break will be determined by the time constants associated with the search amplifier circuitry, as will be hereinafter detailed. Alternatively, the fast forward reeling operation may be selectively halted by momentarily depressing the listen button 54. This breaks the B+ operating potential circuit path to the search amplifier thereby disabling same and de-energizing the relay 36. To again commence the fast forward reeling operation, an operator need only momentarily depress the skip button 52, and the above-described cycle of operation will be repeated.

It will be understood that instead of the relay 36, other holding circuit switching arrangements could be utilized to maintain the B+ operating potential circuit path to the search amplifier 32 and solenoid 16 in response to the search amplifier holding current.

A search amplifier suitable for use in the system of the present invention is illustrated schematically in FIGURE 2. Briefly described, the circuit operates as follows.

In the absence of an applied input message signal, transistors $Q_1$ and $Q_2$ are biased at or below cutoff and are therefore non-conducting. When a message signal is applied through the coupling capacitor $C_1$ across the base-to-emitter junction of transistor $Q_1$, the transistor is turned on and caused to conduct heavily, thereby causing its collector voltage to drop rapidly. A diode $D_1$, connected between the collector electrode of transistor $Q_1$ and a capacitor $C_2$, is poled in the direction to detect this voltage drop.

Initially, in the absence of an applied message signal, the capacitor $C_2$ is charged through the voltage dividing resistors $R_4$ and $R_5$ to a value slightly less than the collector voltage of transistor $Q_1$. Thus, the diode $D_1$ is reverse biased. In the presence of signal, the change in collector voltage of transistor $Q_1$ is detected by the diode $D_1$ and coupled across the capacitor $C_2$ to discharge capacitor $C_2$ to a lower voltage. Since the capacitor $C_2$ is connected directly to the base electrode of transistor $Q_2$, the drop in transistor $Q_1$'s collector voltage coupled to the capacitor $C_2$ will also be applied directly to the base of the transistor $Q_2$, thereby turning said transistor on. When transistor $Q_2$ is turned on, current is caused to flow through the loading device (relay 34) thereby energizing same and causing a continuance of the fast forward reeling operation.

If the applied message signal should now be interrupted due to a quiet passage such as that which occurs at the end of a music selection, the transistor $Q_1$ will be turned off and consequently its collector voltage will rise towards its initial non-conducting value. The capacitor $C_2$ will then charge up to its no signal steady state value as determined by the voltage dividing resistors $R_4$ and $R_5$. The charge path for this action is through resistor $R_4$. The time constant determining resistance is the parallel combination of resistors $R_4$, $R_5$, and the input impedance to the transistor $Q_2$. As the capacitor $C_2$ charges, its rising voltage is directly coupled to the base electrode of the transistor $Q_2$. This causes the collector current of transistor $Q_2$ to decrease slowly toward cutoff. During this action, the drop-out current value for the relay will be reached after which the relay will be deenergized causing a cessation of the fast forward tape reeling operation.

Representative component values are tabulated below. Depending upon the relay used, the gain of the search amplifier and the average level of an applied message signal input, the circuit time constant can be adjusted to provide for deenergization of the relay in response to a break in the message signal input of at least three seconds duration (measured at the normal tape reeling speed) thereby preventing a false triggering on low level messages or quiet passages in a music selection.

It will be understood that the tape player apparatus fast forward drive mechanism contemplated for use with the search system of the present invention may operate in a manner such that upon disengagement of a fast forward reeling function, a normal reeling (play) operating mode will be automatically initiated. With the system as above described, a fast forward reeling operation can be interrupted at any time in favor of the normal reeling operation by momentarily depressing the listen button 54, $R_1$—1 megohm
$R_2$—18K ohms
$R_3$—82K ohms
$R_4$—100K ohms
$R_5$—390K
$R_6$—6.8K
$R_7$—1.5K
$C_1$—.056 microfarad
$C_2$—2 microfarads
$D_1$—1N34
$D_2$—1N34

$Q_1$—Fairchild—SE4002
$Q_2$—RCA—2N408
B+—28 volts D.C.
Relay 36—1K ohm D.C. impedance relay with a pull in and drop out current of 7.2 ma. and 1.5 ma. respectively.

What is claimed is:

1. In a tape player apparatus, a system for selectively fast forward reeling of pre-recorded tape, comprising:
first means for initiating fast forward reeling of said tape;
a transducer adapted to provide an electrical signal in response to a message signal pre-recorded on said tape;
a first and a second transistor each having a base, an emitter and a collector electrode;
means coupling said transducer to the base electrode of said first transistor;
a first diode coupled between the collector electrode of said first transistor and the base electrode of said second transistor;

a resistor and a capacitor connected in parallel and coupled between the base electrode of said second transistor and a point of reference potential;
a second diode coupled between the base and emitter electrodes of said second transistor; and
means coupled to said second transistor and operative to stop fast forward reeling when said second transistor is non-conductive.

References Cited

UNITED STATES PATENTS 2,606,253 8/1952 Somers ----------- 179—100.1

BERNARD KONICK, Primary Examiner
R. S. TUPPER, Assistant Examiner

U.S. Cl. X.R.

179—100.1; 307—293